US012536244B2

(12) United States Patent
Hernandez et al.

(10) Patent No.: US 12,536,244 B2
(45) Date of Patent: Jan. 27, 2026

(54) SYSTEM, METHOD, AND COMPUTER PROGRAM FOR PROVIDING AN END-TO-END SOLUTION FOR FRONTEND PAGE GENERATION

(71) Applicant: Rakuten Group, Inc., Tokyo (JP)

(72) Inventors: Armando Hernandez, Foster City, CA (US); Sundar Krishnamurthy, Saratoga, CA (US); Bo Jiang, San Mateo, CA (US); Tommy Tan, San Leandro, CA (US); Jia Xu, San Mateo, CA (US); Victor Arthur Nazareth, Redwood City, CA (US); Yaodong Yu, San Mateo, CA (US); Giuliano Manno, San Francisco, CA (US)

(73) Assignee: Rakuten Group, Inc., Tokyo (JP)

( * ) Notice: Subject to any disclaimer, the term of this patent is extended or adjusted under 35 U.S.C. 154(b) by 877 days.

(21) Appl. No.: 17/679,238

(22) Filed: Feb. 24, 2022

(65) Prior Publication Data
US 2023/0214440 A1 Jul. 6, 2023

Related U.S. Application Data

(60) Provisional application No. 63/295,195, filed on Dec. 30, 2021.

(51) Int. Cl.
*G06F 16/957* (2019.01)
*G06F 16/9535* (2019.01)
*G06F 16/958* (2019.01)
(52) U.S. Cl.
CPC ...... *G06F 16/9577* (2019.01); *G06F 16/9535* (2019.01); *G06F 16/958* (2019.01)
(58) Field of Classification Search
None
See application file for complete search history.

(56) References Cited

U.S. PATENT DOCUMENTS 7,027,997 B1 * 4/2006 Robinson ......... G06Q 10/06311
719/310
7,624,114 B2 * 11/2009 Paulus .................. G06F 16/972
707/999.005
(Continued)

FOREIGN PATENT DOCUMENTS

JP 2008-40788 A 2/2008

OTHER PUBLICATIONS

Iron Speed, Build Web 2.0 Applications without hand-coding, White paper Feb. 2010 (Year: 2010).*
(Continued)

*Primary Examiner* — Howard Cortes
(74) *Attorney, Agent, or Firm* — Lessani Law Group, PC

(57) ABSTRACT

The present invention provides an end-to-end solution for frontend page generation. The system includes a design module that enables a user to design UI components, an annotation submodule that enables a user to annotate the UI components with design element attributes, a database that stores database objects having database object attributes according to a data schema, a mapper module that enables a user to map design element attributes of the UI components to database object attributes without coding via a graphical user interface, a content management module that enables a user to add mapped UI components to a frontend page feed and to associate the mapped UI components with instances of the database objects, a feed generation module that retrieves instance-specific values for the database object attributes of mapped UI components in frontend page feeds, and a metadata bus that enables the modules and database to communicate.

21 Claims, 10 Drawing Sheets

(56) References Cited

U.S. PATENT DOCUMENTS

| | | | | |
|---|---|---|---|---|
| 8,914,738 B2* | 12/2014 | Gobel | ................ | G06F 8/38 |
| | | | | 715/764 |
| 2002/0198909 A1* | 12/2002 | Huynh | ................ | G06F 40/30 |
| | | | | 715/201 |
| 2003/0221162 A1* | 11/2003 | Sridhar | ................ | G06F 16/972 |
| | | | | 715/229 |
| 2004/0205545 A1* | 10/2004 | Bargeron | ................ | G06F 40/169 |
| | | | | 715/205 |
| 2005/0149206 A1* | 7/2005 | Krane | ................ | G06F 9/451 |
| | | | | 700/17 |
| 2007/0088741 A1* | 4/2007 | Brooks | ................ | G06F 16/289 |
| 2009/0024652 A1* | 1/2009 | Thompson | ................ | G06F 16/252 |
| | | | | 707/999.102 |
| 2010/0318556 A1* | 12/2010 | McKay | ................ | G06Q 10/10 |
| | | | | 707/769 |
| 2017/0075902 A1* | 3/2017 | Hoffner | ................ | G06F 16/252 |
| 2018/0011610 A1* | 1/2018 | Ragan, Jr. | ................ | G06F 3/04817 |

OTHER PUBLICATIONS

Anonymous: "Product Tour—Tour the leading application generator: Iron Speed Designer", Dec. 31, 2015, pp. 1-11.
Concise Explanation of Relevance of Cited Document 1: JP 2008-040788A.

* cited by examiner

SYSTEM, METHOD, AND COMPUTER PROGRAM FOR PROVIDING AN END-TO-END SOLUTION FOR FRONTEND PAGE GENERATION

RELATED APPLICATION

This application claims the benefit of U.S. Provisional Patent Application No. 63/295,195 titled "System, Method, and Computer Program for Providing an End-to-end Solution for Frontend Page Generation," which was filed on Dec. 30, 2021, the contents of which are incorporated by reference as if fully disclosed herein.

BACKGROUND OF THE INVENTION

1. Field of the Invention

This invention relates generally to frontend development and, more specifically, to a system and method for providing an end-to-end solution, from design to publishing, for frontend page generation.

2. Description of the Background Art

In existing frontend page generation solutions, the design system, content management system, and feed generation system are all separate, standalone systems that do not communicate and that require manual intervention for collaboration. Each system requires its own resources for design and development, which can be time consuming and costly, especially for websites where the user interface (UI) components change frequently. The present invention provides a system in which there is a separation of responsibilities among the design, content management, and feed generation modules, which provides flexibility and efficiency in change, but a clear and cohesive communication between the modules via a metadata bus. Furthermore, the present invention enables a user to make changes to a website with little or no coding and, as a result, provides an end-to-end solution from the design of the UI to the content provided to the client application for rendering in a user interface.

SUMMARY OF THE DISCLOSURE

The present disclosure describes a system, method, and computer program for providing an end-to-end solution, from design to publishing, for frontend page generation. The method is performed by a computer system that includes servers, storage systems, networks, operating systems, and databases.

Instead of three separate systems requiring resource-intensive manual intervention to interconnect, the present invention provides a solution in which a user is able to make changes to a website or mobile application webview with little or no coding, and the design, content management, and feed generation modules communicate in a clear and cohesive way via a metadata bus to provide the frontend page to the client application with instance-specific values.

In one embodiment, a method for enabling frontend page generation, from design to publishing, comprises the following steps:

- enabling a user to design UI components;
- enabling a user to annotate the UI components with design element attributes;
- receiving a user's annotations of a UI component;
- generating metadata for the annotated UI component, wherein the metadata describes the design element attributes;
- retrieving metadata related to database object attributes of a database object;
- using the metadata for the design element attributes and the metadata from the database object attributes to provide a user interface that enables a user to map each of the design element attributes of the UI component to one of the database object attributes without coding;
- receiving the user's mapping of design element attributes to database object attributes for the UI component;
- enabling a user to add the UI component to a frontend page feed and to associate the mapped UI component with one or more instances of the database object;
- receiving a request for the frontend page from a client application;
- retrieving from the database instance-specific values for the business object attributes mapped to the UI component; and
- providing the frontend page to the client application with the instance-specific values for the business object attributes of the UI component.

DETAILED DESCRIPTION OF THE PREFERRED EMBODIMENTS

The present disclosure describes a system, method, and computer program for providing an end-to-end solution, from design to publishing, for frontend page generation. A frontend page of a software program or website is everything with which the user interacts. For example, a frontend page may include a webpage, a webview in a mobile application, or any other user interface screen visible to a user in a client device. The method is performed by a computer system that includes servers, storage systems, networks, operating systems, and databases ("the system").

Example implementations of the method are described in more detail with respect to FIGS. 1-8.

1. Method for Prior Art Webpage Generation

Figure 1:
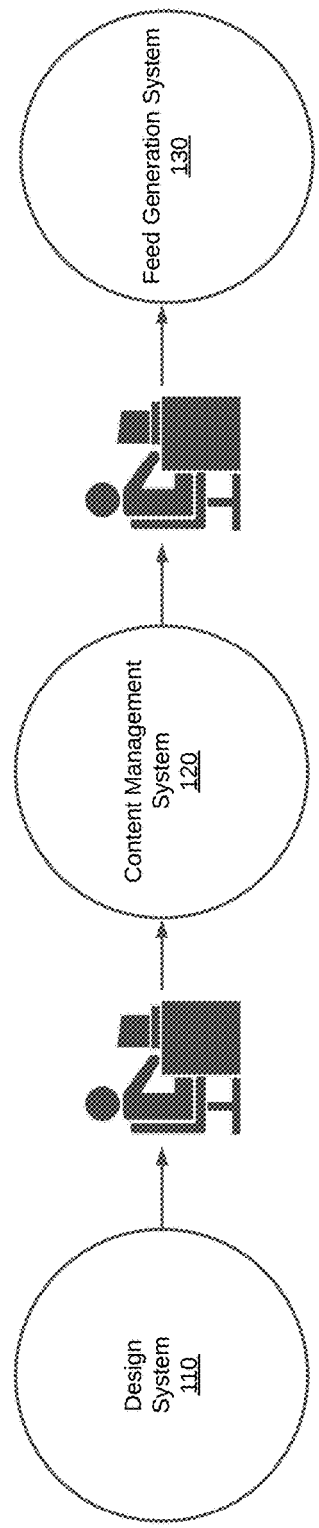
FIG. 1 is a flowchart that illustrates a method for prior art webpage generation.

FIG. 1 illustrates a method for prior art webpage generation. As seen in FIG. 1, the design system 110, the content management system 120, and the feed generation system 130 are each a standalone system and are not connected. Rather, a user (e.g., a software developer) has to manually program or code the association between these systems, which requires significant resources. For example, the content management system 120, which defines the data, and the feed generation system 130, which defines which data is being used, need to be manually connected, and both of these need to be matched to a design in the design system 110.

2. Example System Architecture

Figure 2:
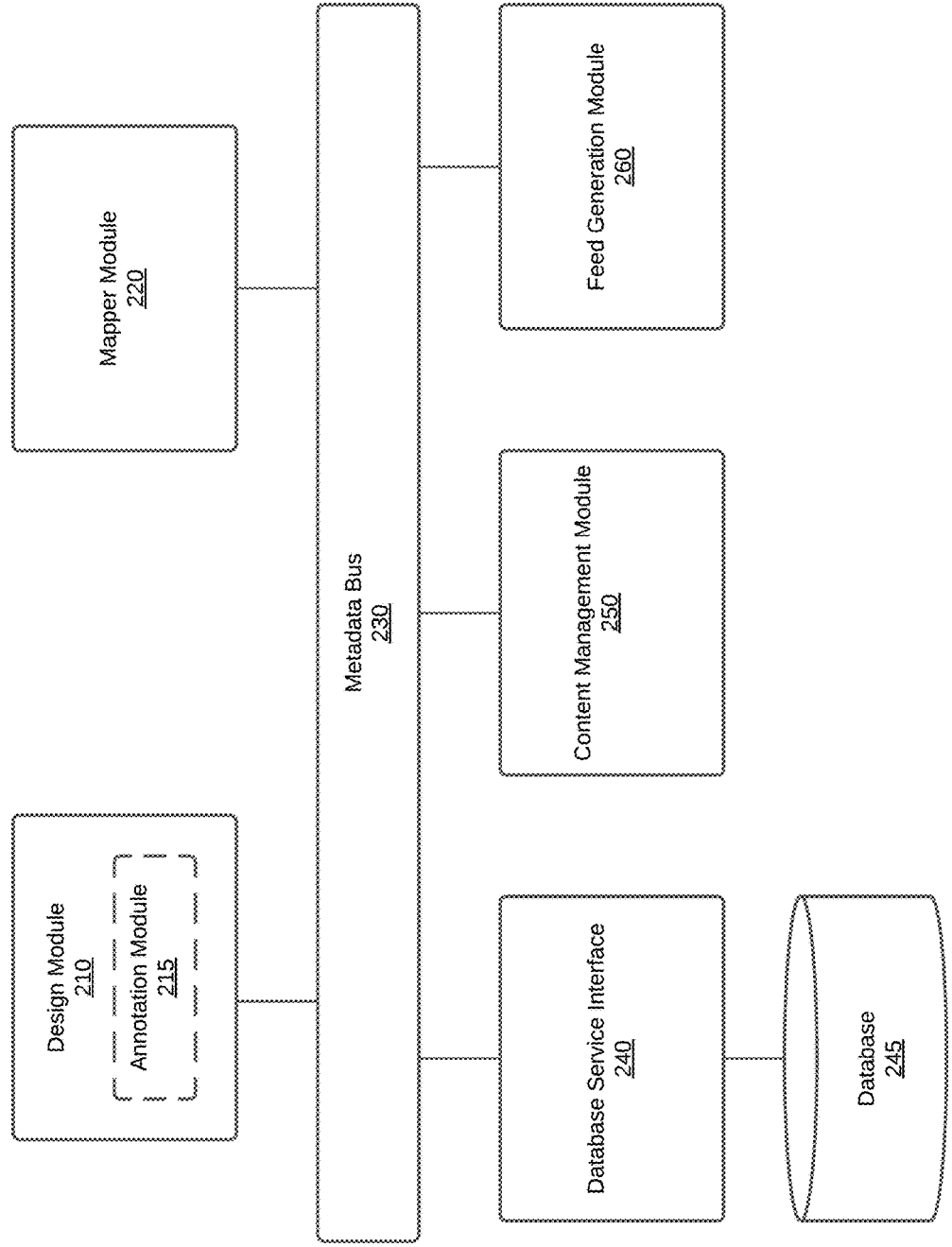
FIG. 2 is a block diagram that illustrates an example system architecture, according to one embodiment, for design-to-publishing frontend page generation.

FIG. 2 illustrates an example architecture for a system that performs the methods described herein. However, the methods described herein may be implemented in other systems and are not limited to the illustrated system.

As seen in FIG. 2, the design module 210 enables a user to design UI components. In certain embodiments, the design module may be native to the system or a third-party application that is included in the system (e.g., FIGMA). Within the design module 210 is an annotation submodule 215. In certain embodiments, the annotation submodule 215 is a software plugin to the design module 210. The annotation submodule 215 enables a user to annotate the UI components with design element attributes by configuring one or more fields of a user interface, where each field is associated with predefined field properties. As each field in the user interface is fully configurable, this enables a user to easily add new field types. The predefined field properties are later mapped to specific business object properties, but beginning with generic predefined field properties enables the UI elements to be easily changed and to have maximal flexibility.

In certain embodiments, the annotation submodule 215 has one or more type definitions, such as simple types (e.g., simple text, links, or URLs) and complex types (e.g., button components, simple image components, rewards, etc.), where the simple types and complex types have the following exemplary components:
Simple Types (Based on Lowest Level of Different Kinds of Property Values):
   String, Link, ImageURL, Hex, Icon, Boolean
Complex Types (Based on Combinations of Simple Types):
   Simple Text
      <Item Text, type: string>
   Button
      <ButtonText, type: string>
   <CTA URL, type: Link>
   Image
      <Alt Text, type: string>
      <Image URL, type: ImageURL>
      <Background Color, type: Hex>
   Complex Image (Linked Image):
      <Alt Text, type: string>
      <Image URL, type: ImageURL>
      <Background Color, type: Hex>
      <CTA URL, type: Link>
All type definitions have extensible properties such as:
<isOptional, type: Boolean> and <isOverridable, type: Boolean>. These properties give the content management module user the ability to control inclusion or replacement of the attribute when setting up a topic using a UI component within a feed definition. When annotating a UI component, the user selects the type (e.g., simple or complex) for each of the attributes in the UI component, which will be stored as part of its metadata. Examples of metadata include image, text, button, linked image, linked text, etc.

A database 245 stores database objects having database object attributes according to a data schema. In certain embodiments, the database objects are business objects, and the data schema is a database representation of the business objects such as merchants, coupons, products, and categories whose properties are accessible through the APIs. In certain embodiments, the business objects are store objects (e.g., an instance of a store object is MACY'S) having one or more properties (e.g., URL for a store, an image for a store, a color for a store, etc.). In certain embodiments, the business objects include a database table with data for a plurality of stores. For example, the database table may include store information, where each row is an instance of a store object (i.e., each row provides information for a different store) and each column corresponds to a different store object property (e.g., store name, store image, store URL, etc.).

A mapper module 220 enables a user to map design element attributes of the UI components to database object attributes without coding via a database service interface 240. In order for UI components to display business object data, they have to be associated with business object properties. The mapper module 220 eliminates the need for a programmer to manually code this association. The mapper module 220 obtains the field properties for the fields added to a UI component. It also obtains business object properties for business objects. The mapper module 220 enables a user to map generic field properties to specific business object properties. The mapper module 220 generates an association with the UI component and the business object for a content management module 250 and a feed generation module 260 to use during content selection and feed generation.

In certain embodiments, since the UI component attribute's type has already been defined in the metadata, only the matching attributes defined in the metadata of the business object will be available for selection. For example, only ImageURL values from the data schema are allowed for selection of ImageURL types in component values of that type.

The content management module 250 enables a user to add mapped UI components to a frontend page feed and to associate the mapped UI components with instances of the database objects. In certain embodiments, a user can select from a library of UI components to add one or more UI components to the frontend page feed. The content management module 250 communicates with the mapper module 220 to obtain the library of UI components. For each UI component added to the feed, the content management module 250 enables a user to specify instance(s) of the business object for which data will be displayed in the frontend page via the UI component. For example, a user may specify the specific stores for which data will be displayed in the frontend page.

The feed generation module 260 retrieves instance-specific values for the database object attributes of mapped UI components in the frontend page feeds, where the instance-specific values for the frontend page are retrieved from the database in response to a request for the frontend page by a client application. In certain embodiments, a frontend page may comprise multiple sections, where each section includes the design (i.e., the UI components) and data. The feed generation module 260 obtains the feed definition from the content management module 250 and then obtains the data from the database 245 via the database service interface 240. Each of the design module 210, database 245 (via the database service interface 240), mapper module 220, content management module 250, and feed generation module 260 transmits metadata (e.g., related to the design element attributes, the database object attributes, and the mappings of design element attributes to database object attributes) to a metadata bus 230, which, in turn, transmits the metadata to the other modules that require the information.

Figure 9:
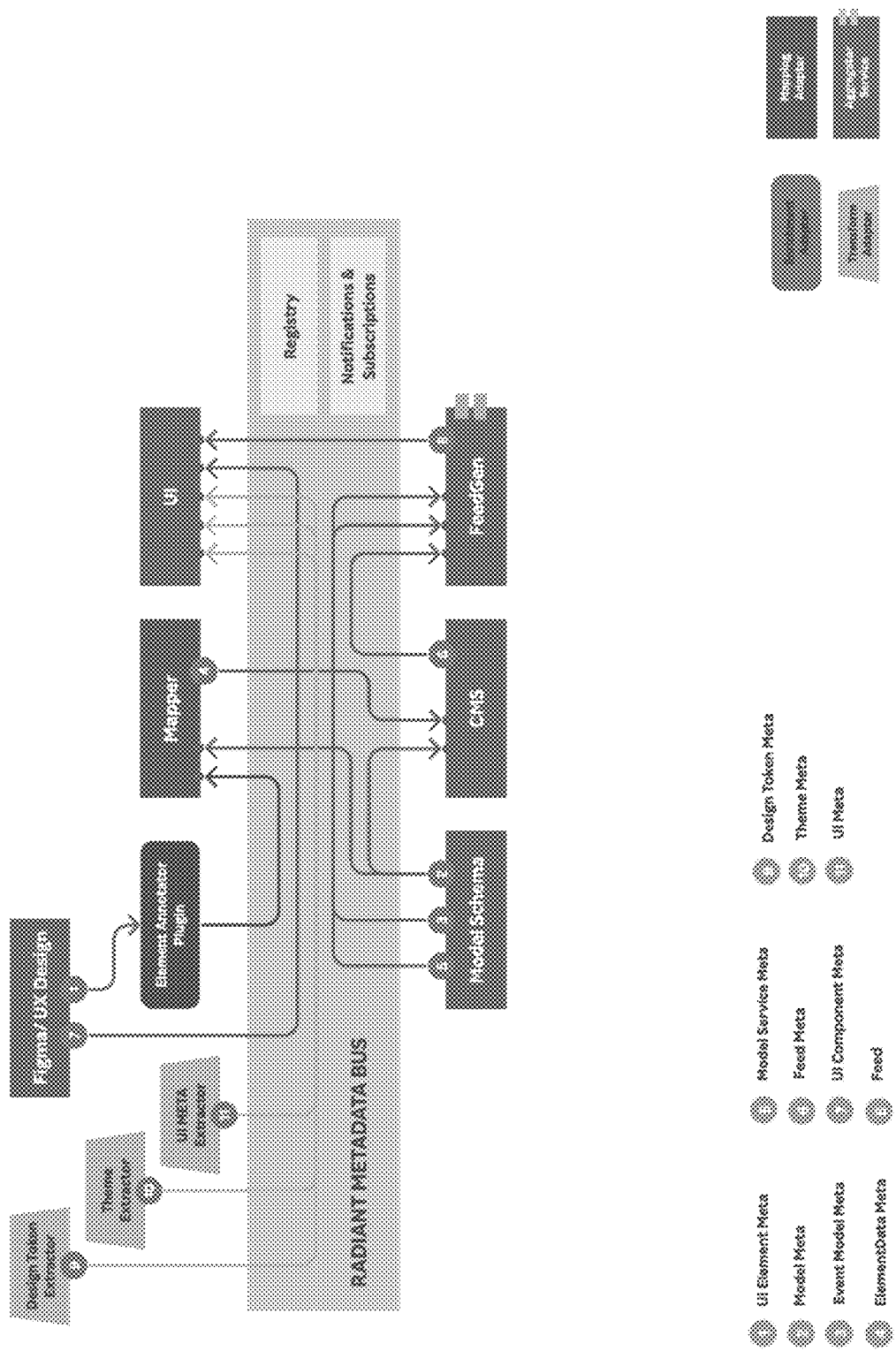
FIG. 9 is a block diagram that illustrates an example system architecture, according to one embodiment, for a metadata bus.

The metadata bus 230 serves as a central communication service for all other modules (e.g., tools, services, and/or client applications) that participate in the system. See, e.g., FIG. 9, which illustrates an example system architecture, according to one embodiment, for a metadata bus). The tools and services that publish metadata do so by registering their metadata updates to the metadata bus 230. Any tools, services, and/or client applications that are interested in any metadata published by the services can subscribe to receive update message notifications or can query the metadata bus 230 for any metadata of interest. By the metadata bus 230 serving as a central communication service, this eliminates the direct point-to-point communication of any metadata producers.

All the existing metadata component services fit in the traditional service bus definition in that they provide services for enrichment, transformation, aggregation, mapping, etc. The metadata bus 230 provides a standard way for any service to find out the location and version of any metadata artifact type (e.g., UI metadata, component mapping metadata, theme metadata, token metadata, etc.) without having to know the precise details of all the artifact producers.

In certain embodiments, to enable a user to map design element attributes to database object attributes, the mapper module 220 retrieves metadata related to the design attributes from the annotation submodule 215 via the metadata bus 230, and retrieves metadata for the business objects (e.g., metadata created for all merchants, coupons, categories, etc.) from the database 245 via the metadata bus 230. The business objects are entered into the database 245 via the database service interface 240 by one or more businesses. In certain embodiments, to enable a user to add mapped UI components to a feed, the content management module 250 obtains metadata for the mapped UI components from the mapper module 220 via the metadata bus 230, and where, to enable the user to associate the mapped UI components with instances of database objects, the content management module 250 extracts data for the instances of the data object from the database 245.

In certain embodiments, enabling a user to annotate UI components with design element attributes includes enabling a user to annotate UI components with fields, where each field is associated with one or more predefined field properties, and where mapping design element attributes to business object attributes includes mapping field properties to business object attributes. In certain embodiments, a developer may load predefined field properties into the annotation submodule 215 via a configuration tool. For each design "atom" (i.e., the smallest component of a UI component), the developer can select a field property that can be associated with the element during the annotation process.

3. Method for a Design-to-Publishing Frontend Page Generation Process

Figure 3A:
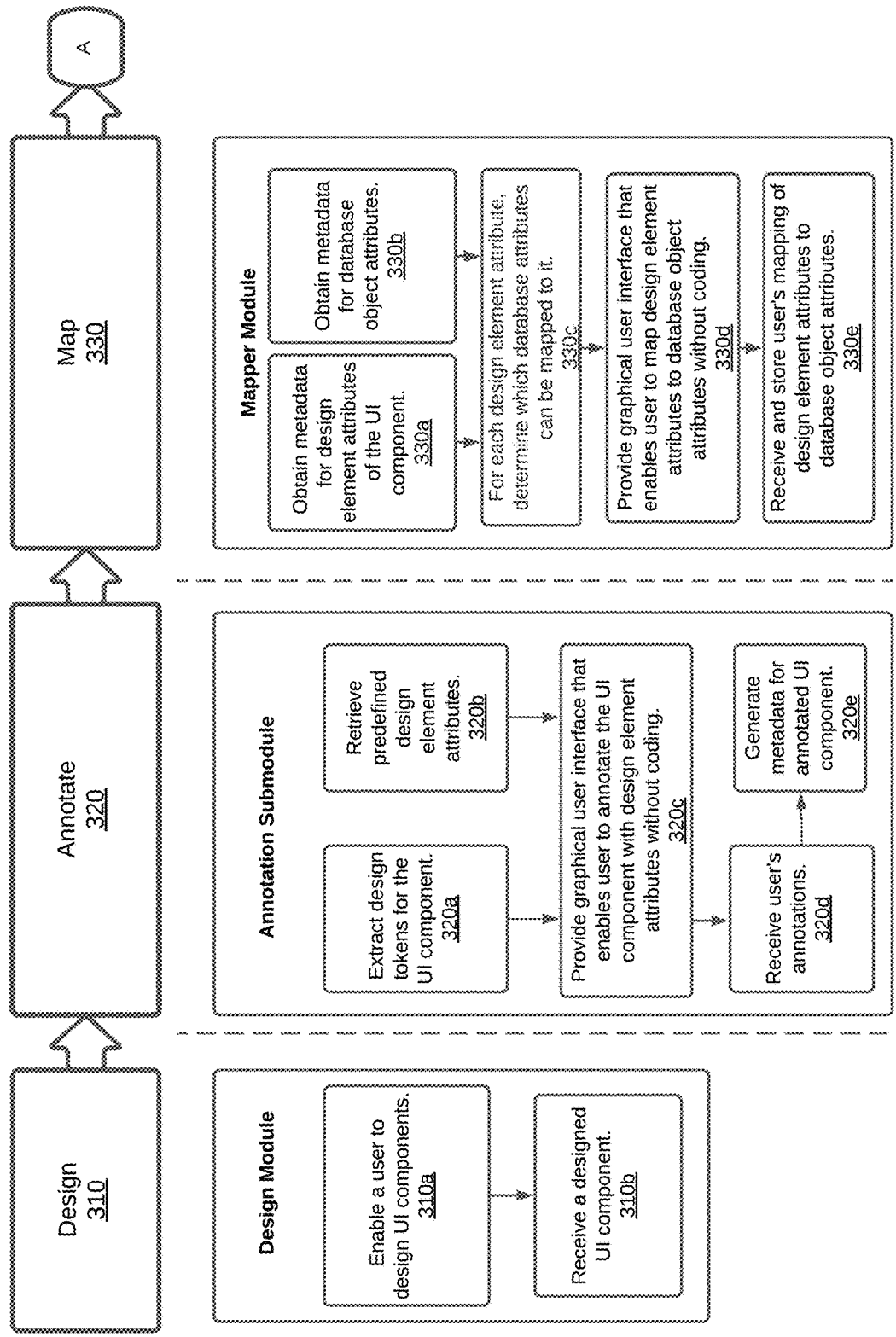
FIGS. 3A-3B are flowcharts that illustrate a method, according to one embodiment, for a design-to-publishing frontend page generation process.
Figure 3B:
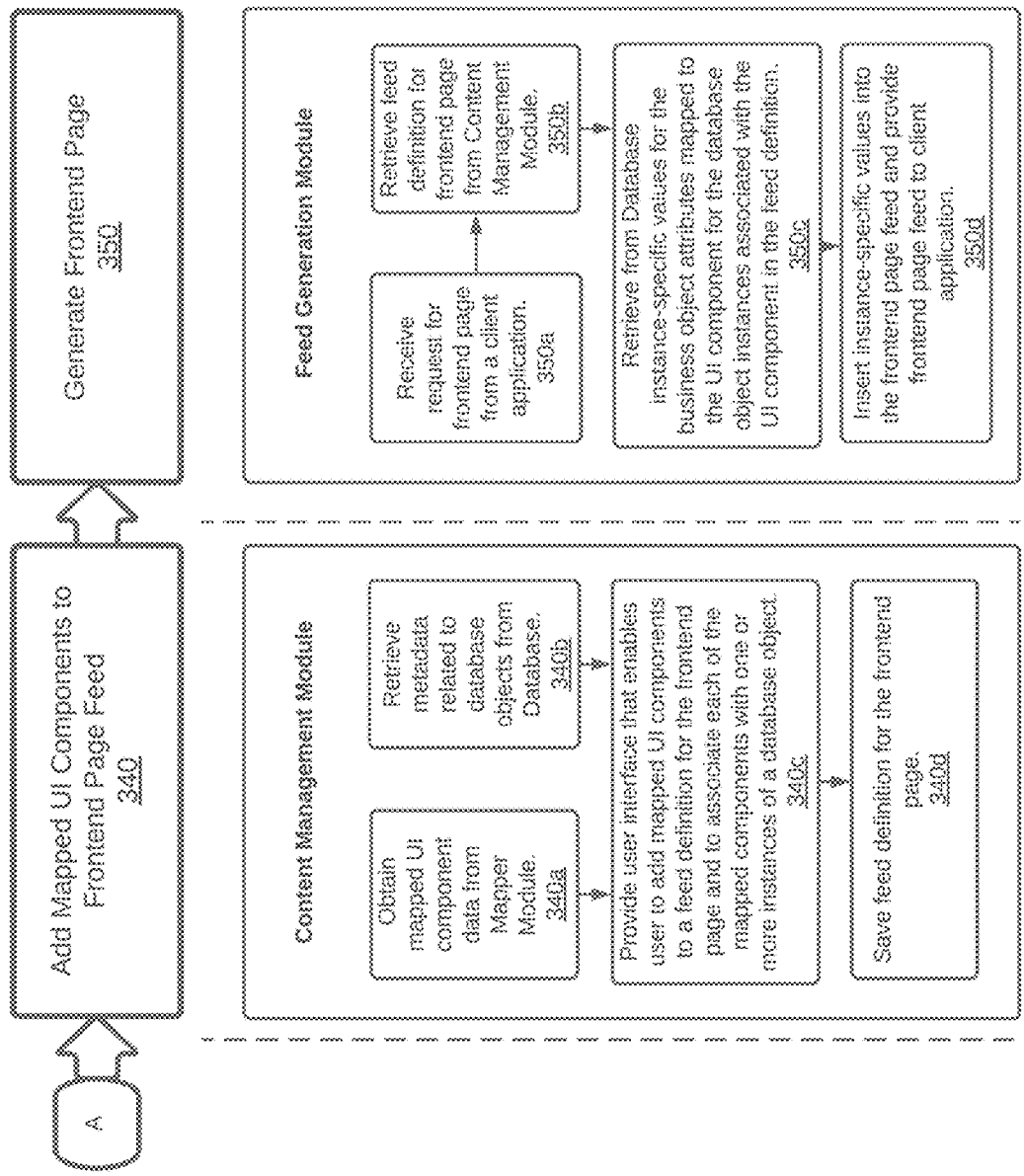

FIGS. 3A-3B illustrate a method for a design-to-publishing frontend page generation process. As seen in FIGS. 3A-3B, the system enables a user to design UI components (step 310). This step is performed by the design module and includes enabling a user to design UI components (step 310a) and receiving a designed UI component (step 310b).

The system enables a user to annotate the UI components with design element attributes (step 320). This step is performed by the annotation submodule and includes extracting design tokens for the UI component (step 320a), retrieving predefined design element attributes (step 320b), providing a graphical user interface that enables a user to annotate the UI components with design element attributes without coding (step 320c), receiving a user's annotations of a UI component (step 320d), and generating metadata for the annotated UI component, where the metadata describes the design element attributes (step 320e). In certain embodiments, a design token is a way to represent a design decision or design standard in a design system. For example, a design token may represent that a text is set at 14 points, or that the color of a frontend page's background is white. Anytime a user creates a UI component, the UI component is associated with one or more design tokens that determine how it will be rendered visually. The annotation submodule extracts the design tokens and uses them along with the predefined design element attributes to annotate the UI components with design element attributes enabled through a graphical UI. The system retrieves metadata related to database object attributes of a database object. The system uses the metadata for the design element attributes and the metadata for the database object attributes to provide a user interface that enables a user to map each of the design element attributes of the UI component to one of the database object attributes without coding (step 330). This step is performed by the mapper module and includes obtaining metadata for the design element attributes of the UI component (step 330a), obtaining metadata for database object attributes (step 330b), determining which database attributes can be mapped to each design element attribute by comparing the field types in the obtained metadata (step 330c), providing a graphical user interface that enables a user to map design element attributes to database object attributes without coding (step 330d), and receiving and storing a user's mapping (and any associated metadata) of design element attributes to database object attributes for the UI component (step 330e). In certain embodiments, determining which database attributes can be mapped to each design element attribute includes comparing the type of field to what was initially assigned during the annotation step and showing only those that match. In certain embodiments, when the system determines which database attributes can be mapped to each design element attribute by comparing the field types in the obtained metadata, the system provides the eligible options (i.e., options having an eligible field type) in a drop-down menu. In certain embodiments, eligibility is defined by matching the type assigned to the design attribute with the type of the business object field in the metadata.

The system enables a user to add the UI component to a frontend page feed and to associate the mapped UI component with one or more instances of the database object (step 340). This step is performed by the content management module and includes obtaining mapped UI component data from the mapper module (step 340a), retrieving metadata related to database objects from the database (step 340b), providing a user interface that enables a user to add mapped UI components to a feed definition for the frontend page and to associate each of the mapped components with one or more instances of a database object (where the one or more instances of the database object are generated from the metadata related to business objects in the database) (step 340c), and saving the feed definition (and any associated metadata) for the frontend page (step 340d).

The system then generates the frontend page (step 350). This step is performed by the feed generation module and includes receiving a request for a frontend page from a client application (step 350a), retrieving a feed definition for the frontend page from the content management module (step 350b), retrieving from the database instance-specific values for the business object attributes mapped to the UI component for the database object instances associated with the UI component in the feed definition (step 350c), and inserting instance-specific values for the business object attributes of the UI component into the frontend page feed and providing the frontend page feed to the client application (step 350d). In other words, the frontend page feed provided by the feed generation module can compose the final frontend page based on the feed and the references to different types of components being passed in the feed.

4. Example Screenshot of User Interface for Annotating UI Components

Figure 4:
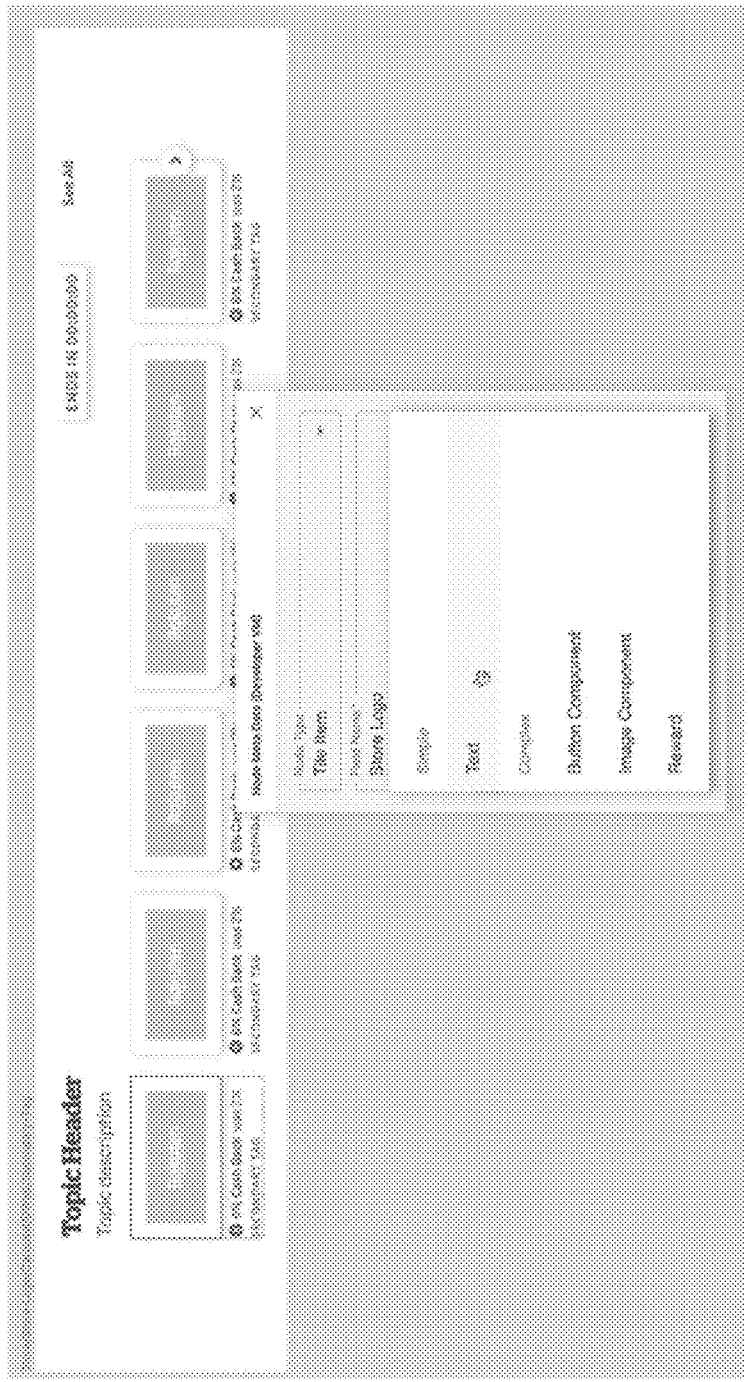
FIG. 4 is a screenshot of an exemplary graphical user interface, according to one embodiment, for annotating UI components.

FIG. 4 illustrates a screenshots of an exemplary graphical user interface for annotating UI components according to the present invention. A person skilled in the art would understand that the present invention may be embodied in other user interfaces having more or less functionality within the scope of the present invention. As such, FIG. 4 is intended to be illustrative and not limiting in any way. As seen in FIG. 4, a user has annotated the node type "Tile Item" with the "Store Logo" field.

Figure 5:
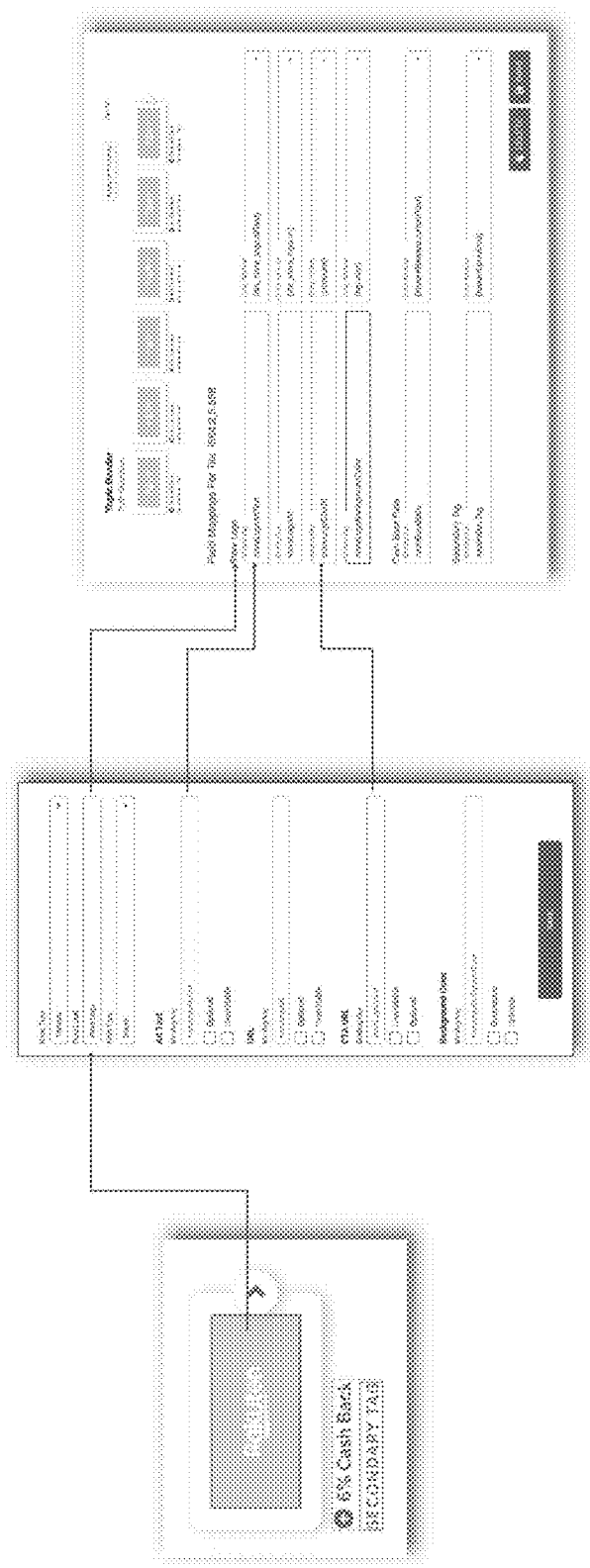
FIG. 5 is a screenshot of an exemplary user interface, according to one embodiment, for an annotation-to-mapping process.

5. Example Screenshot of User Interface for an Annotation-to-Mapping Process FIG. 5 illustrates screenshots of an exemplary user interface for an annotation-to-mapping process according to the present invention. A person skilled in the art would understand that the present invention may be embodied in other user interfaces having more or less functionality within the scope of the present invention. As such, FIG. 5 is intended to be illustrative and not limiting in any way.

As seen in FIG. 5, a user selects a UI component in the design module. The user annotates the UI component with a field. The user can specify whether the field properties associated with the field are optional. The user can also specify whether a user can override the mappings (performed by the mapper module) when a user adds the UI component to a frontend page feed in the content management module. The user then maps the field properties to the store object properties.

In certain embodiments, when a user selects the optional check box, the mapper module is not required to create a mapping for the attribute. In such a scenario, if the mapper module creates a mapping, the mapping will be displayed, but if the mapper module does not create a mapping, the mapping will not be displayed.

Figure 6:
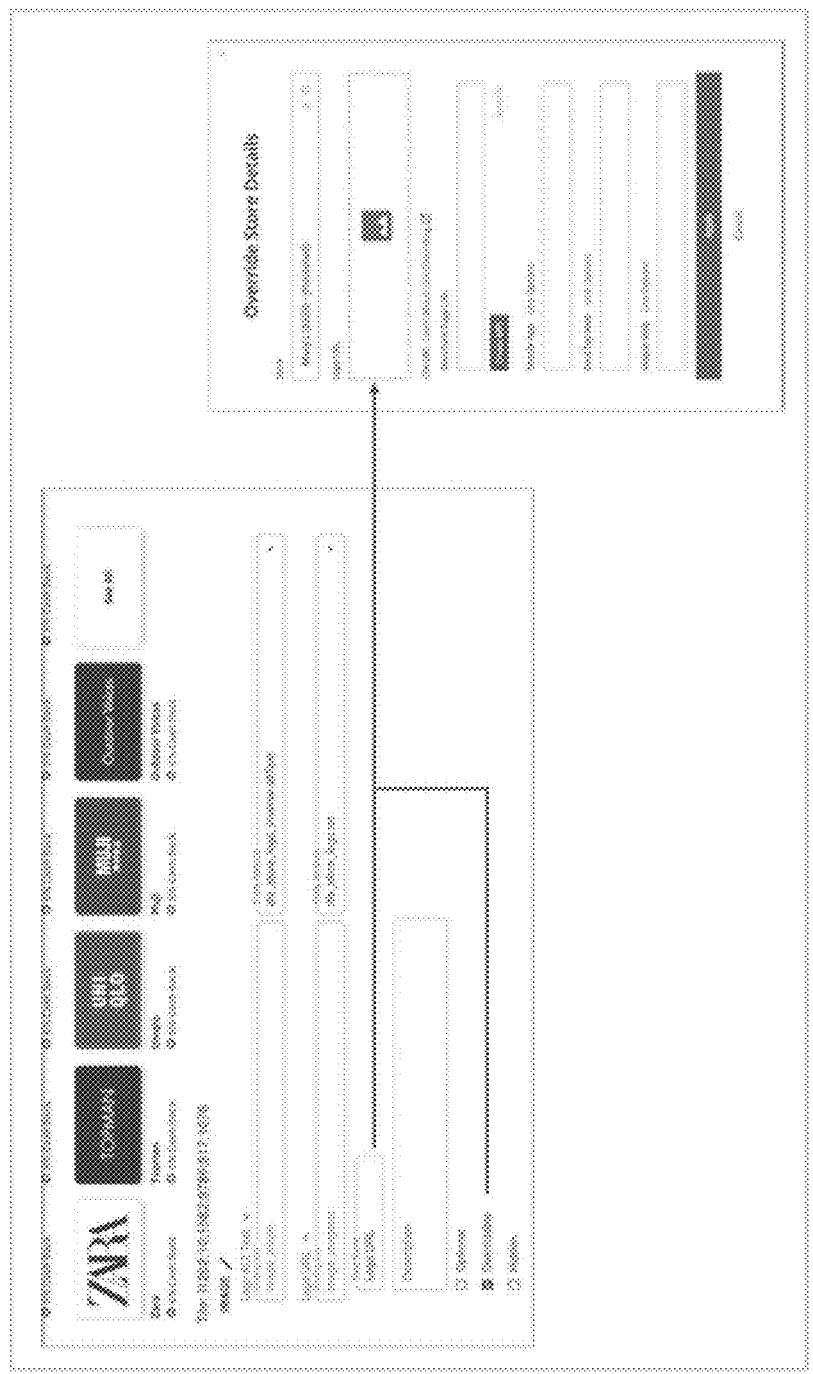
FIG. 6 is a screenshot of an exemplary user interface, according to one embodiment, of a mapping being overridden in a content management module.

6. Example Screenshot of User Interface for Showing How a UI Component Attribute is Set to Overridable in the Mapper Module FIG. 6 illustrates a screenshot of an exemplary user interface of a mapping being overridden in the content management module according to the present invention. A person skilled in the art would understand that the present invention may be embodied in other user interfaces having more or less functionality within the scope of the present invention. As such, FIG. 6 is intended to be illustrative and not limiting in any way.

As seen in FIG. 6, a UI component attribute is set to be overridable in the mapper module. When the component is selected in the content management module, the user has the option to replace or override the default business object attribute (e.g., image in this case) with a custom value (e.g., text, image, color, etc.). For example, if the default business object attribute for the background is the store image, a user can select an option to override the default with a custom background. In certain embodiments, overriding the default business object attribute with a custom value is global (e.g., for all stores). In certain embodiments, overriding the default business object attribute with a custom value is local (e.g., for specific stores). Overriding takes place on a per mapping basis such that, whereas the mapper module would normally pull from a certain default field, but instead, due to the overriding option being selected in the content management module, the mapper module pulls from different custom field.

Figure 7A:
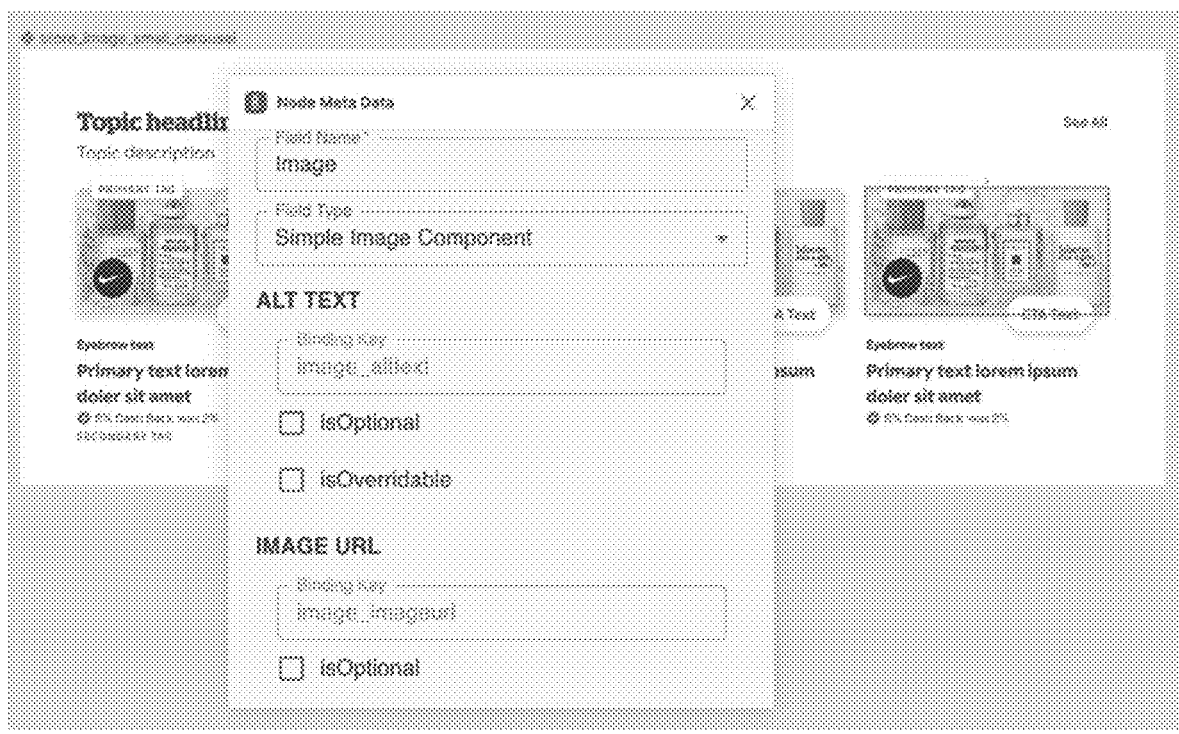
FIGS. 7A-7B are screenshots of an exemplary user interface, according to one embodiment, for mapping attributes based on matching types.
Figure 7B:

7. Example Screenshot of User Interface for Mapping Attributes Based on Matching Types FIGS. 7A-7B illustrate screenshots of an exemplary user interface for mapping attributes based on matching types. A person skilled in the art would understand that the present invention may be embodied in other user interfaces having more or less functionality within the scope of the present invention. As such, FIGS. 7A-7B are intended to be illustrative and not limiting in any way.

As seen in FIG. 7A, a user selects the field type for the UI component design element. As seen in FIG. 7B, the mapper module uses the type metadata of the UI component attribute to select only the business object attributes with matching type metadata.

Figure 8:
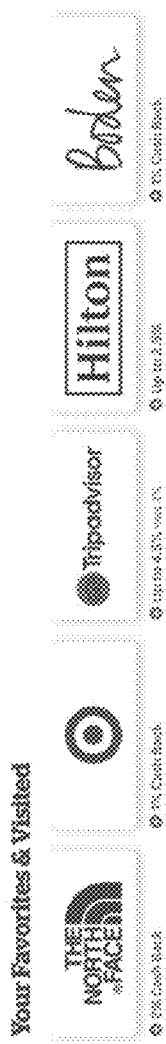
FIG. 8 is a screenshot of an exemplary user interface, according to one embodiment, for a UI component with instance-specific data.

8. Example Screenshot of User Interface for a UI Component with Instance-Specific Data FIG. 8 illustrates a screenshot of an exemplary user interface for one or more UI components created using the user interface of FIG. 4 with instance-specific data according to the present invention. A person skilled in the art would understand that the present invention may be embodied in other user interfaces having more or less functionality within the scope of the present invention. As such, FIG. 8 is intended to be illustrative and not limiting in any way.

FIG. 8 illustrates a "Tile Carousel" that was created and rendered according to the present invention. A user first created a "Tile Carousel" UI component using the design module. The "Tile Carousel" includes a "tile element," which is a rectangular tile template that does not yet have specific store data. The user annotates the tile element with a field using the annotation submodule. In this case, the field has the following field properties: image, alternate text, call-to-action URL, and background color. The user maps the field properties to "Store" object properties using the mapper module. For example, if the store object properties are store image, store text, store URL, and store color, then the mappings would be image→store image, alternate text-→store text, call-to-action URL→store URL, and background color→store color.

In the content management module, the user adds the "Tile Carousel" to a feed for a frontend page and chooses from a list of stores (i.e., THE NORTH FACE, TARGET, TRIPADVISOR, HILTON, and BODEN) as the stores that will be displayed in the "Tile Carousel." The feed generation module receives a request for a feed from the client application, locates the feed definition from the content management module as well as the values (i.e., store image, store text, store URL, and store color) for each of the selected stores, inserts the retrieved values into the feed, and provides the feed to the client application. The client application renders the frontend page with the "Tile Carousel" in the UI.

The tile element in the "Tile Carousel" can easily be changed by changing the mappings. For example, the store object can have multiple image properties, and the image field can be mapped to a different image property. The fields can be mapped to properties of a different object, such as properties of a coupon object if the user wishes to use the "Tile Carousel" to display coupon data.

9. General

The methods described with respect to FIGS. 1-8 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A system for providing an end-to-end solution, from design to publishing, for frontend page generation comprising:
   a design module that enables a user to design UI components;
   an annotation submodule within the design module that enables a user to annotate the UI components with design element attributes, wherein the annotation submodule has one or more type definitions and wherein the one or more type definitions have extensible properties;
   a database that stores database objects having database object attributes according to a data schema;
   a mapper module that enables a user to map design element attributes of the UI components to database object attributes without coding via a graphical user interface, wherein the mapper module uses type metadata of the UI components to select only the database object attributes with matching type metadata;
   a content management module that enables a user to add mapped UI components to a frontend page feed and to associate the mapped UI components with instances of the database objects;
   a feed generation module that retrieves instance-specific values for the database object attributes of mapped UI components in frontend page feeds, wherein the instance-specific values for a frontend page are retrieved from the database in response to a request for the frontend page by a client application; and
   a metadata bus that enables the design module, database, mapper module, content management module, and feed generation module to communicate, including communicating metadata related to the design element attributes, the database object attributes, and the mappings of design element attributes to database object attributes.

2. The system of claim 1, wherein, to enable a user to map design element attributes to database object attributes, the mapper module retrieves metadata related to the design attributes from the annotation submodule via the metadata bus, and retrieves metadata for the business objects from the database via the metadata bus.

3. The system of claim 2, wherein, to enable a user to add mapped UI components to a feed, the content management module obtains metadata for the mapped UI components from the mapping module via the metadata bus, and wherein, to enable the user to associate the mapped UI components with instances of database objects, the content management module extracts data for the instances of the database object from the database.

4. The system of claim 1, wherein the annotation module is a software plugin to the design module.

5. The system of claim 1, wherein enabling a user to annotate UI components with design element attributes comprises enabling a user to annotate UI components with fields, wherein each field is associated with one or more predefined field properties, and wherein mapping design element attributes to business object attributes comprises mapping field properties to business object attributes.

6. The system of claim 1, wherein the database objects are business objects.

7. The system of claim 6, wherein the business objects include a database table with data for a plurality of stores.

8. A method, performed by a computer system, for enabling frontend page generation from design to publishing, the method comprising:
   enabling a user to design UI components;
   enabling a user to annotate the UI components with design element attributes, wherein annotating the UI components includes selecting one or more type definitions and wherein the one or more type definitions have extensible properties;
   receiving a user's annotations of a UI component;
   generating metadata for the annotated UI component, wherein the metadata describes the design element attributes;
   retrieving metadata related to database object attributes of a database object;
   using the metadata for the design element attributes and the metadata from the database object attributes to provide a user interface that enables a user to map each of the design element attributes of the UI component to one of the database object attributes without coding, wherein enabling the user to map each of the design element attributes of the UI component to one of the database object attributes without coding comprises using type metadata of the UI components to select only the database object attributes with matching type metadata;
   receiving the user's mapping of design element attributes to database object attributes for the UI component;
   enabling a user to add the UI component to a frontend page feed and to associate the mapped UI component with one or more instances of the database object;
   receiving a request for the frontend page from a client application;

retrieving from the database instance-specific values for the business object attributes mapped to the UI component; and providing the frontend page to the client application with the instance-specific values for the business object attributes of the UI component.

9. The method of claim 8, wherein, to enable a user to map design element attributes to database object attributes, the mapper module retrieves metadata related to the design attributes from the annotation submodule via the metadata bus, and retrieves metadata for the business objects from the database via the metadata bus.

10. The method of claim 9, wherein, to enable a user to add mapped UI components to a feed, the content management module obtains metadata for the mapped UI components from the mapping module via the metadata bus, and wherein, to enable the user to associate the mapped UI components with instances of database objects, the content management module extracts data for the instances of the database object from the database.

11. The method of claim 8, wherein the annotation module is a software plugin to the design module.

12. The method of claim 8, wherein enabling a user to annotate UI components with design element attributes comprises enabling a user to annotate UI components with fields, wherein each field is associated with one or more predefined field properties, and wherein mapping design element attributes to business object attributes comprises mapping field properties to business object attributes.

13. The method of claim 8, wherein the database objects are business objects.

14. The method of claim 13, wherein the business objects include a database table with data for a plurality of stores.

15. A non-transitory computer-readable medium comprising a computer program, that, when executed by a computer system, enables the computer system to perform the following steps for enabling frontend page generation from design to publishing, the steps comprising:
  enabling a user to design UI components;
  enabling a user to annotate the UI components with design element attributes, wherein annotating the UI components includes selecting one or more type definitions and wherein the one or more type definitions have extensible properties;
  receiving a user's annotations of a UI component;
  generating metadata for the annotated UI component, wherein the metadata describes the design element attributes;
  retrieving metadata related to database object attributes of a database object;
  using the metadata for the design element attributes and the metadata from the database object attributes to provide a user interface that enables a user to map each of the design element attributes of the UI component to one of the database object attributes without coding, wherein enabling the user to map each of the design element attributes of the UI component to one of the database object attributes without coding comprises using type metadata of the UI components to select only the database object attributes with matching type metadata;
  receiving the user's mapping of design element attributes to database object attributes for the UI component;
  enabling a user to add the UI component to a frontend page feed and to associate the mapped UI component with one or more instances of the database object;
  receiving a request for the frontend page from a client application;
  retrieving from the database instance-specific values for the business object attributes mapped to the UI component; and
  providing the frontend page to the client application with the instance-specific values for the business object attributes of the UI component.

16. The non-transitory computer-readable medium of claim 15, wherein, to enable a user to map design element attributes to database object attributes, the mapper module retrieves metadata related to the design attributes from the annotation submodule via the metadata bus, and retrieves metadata for the business objects from the database via the metadata bus.

17. The non-transitory computer-readable medium of claim 16, wherein, to enable a user to add mapped UI components to a feed, the content management module obtains metadata for the mapped UI components from the mapping module via the metadata bus, and wherein, to enable the user to associate the mapped UI components with instances of database objects, the content management module extracts data for the instances of the database object from the database.

18. The non-transitory computer-readable medium of claim 15, wherein the annotation module is a software plugin to the design module.

19. The non-transitory computer-readable medium of claim 15, wherein enabling a user to annotate UI components with design element attributes comprises enabling a user to annotate UI components with fields, wherein each field is associated with one or more predefined field properties, and wherein mapping design element attributes to business object attributes comprises mapping field properties to business object attributes.

20. The non-transitory computer-readable medium of claim 15, wherein the database objects are business objects.

21. The non-transitory computer-readable medium of claim 20, wherein the business objects include a database table with data for a plurality of stores.

* * * * *